US012017150B2

(12) United States Patent
Roeser

(10) Patent No.: US 12,017,150 B2
(45) Date of Patent: Jun. 25, 2024

(54) METHOD FOR OPERATING AN AMUSEMENT PARK AND AMUSEMENT PARK

(71) Applicant: Mack Rides GmbH & Co. KG, Waldkirch (DE)

(72) Inventor: Maximilian Roeser, Vögisheim (DE)

(73) Assignee: MACK RIDES GMBH & CO. KG, Waldkirch (DE)

( * ) Notice: Subject to any disclaimer, the term of this patent is extended or adjusted under 35 U.S.C. 154(b) by 350 days.

(21) Appl. No.: 17/511,790

(22) Filed: Oct. 27, 2021

(65) Prior Publication Data

US 2022/0126211 A1 Apr. 28, 2022

(30) Foreign Application Priority Data

Oct. 28, 2020 (DE) .......................... 102020128395.4

(51) Int. Cl.
*A63G 31/02* (2006.01)
*A63G 31/16* (2006.01)

(52) U.S. Cl.
CPC ............. *A63G 31/02* (2013.01); *A63G 31/16* (2013.01)

(58) Field of Classification Search
CPC .. G06F 3/00; G06F 3/01; A63G 31/02; A63G 31/16; A63B 71/00
USPC .................................................. 472/59, 130
See application file for complete search history.

(56) References Cited

U.S. PATENT DOCUMENTS

| 5,490,784 | A | 2/1996 | Carmein |
| 5,846,134 | A | 12/1998 | Latypov |
| 10,278,883 | B2* | 5/2019 | Walsh ..................... G16H 20/30 |
| 2012/0094814 | A1* | 4/2012 | Atkins ................ A61B 5/1036 482/142 |
| 2013/0040783 | A1 | 2/2013 | Duda et al. |
| 2014/0277739 | A1 | 9/2014 | Kornblush et al. |
| 2017/0148338 | A1* | 5/2017 | So ............................ G09B 9/02 |
| 2017/0242477 | A1 | 8/2017 | Rubin et al. |
| 2018/0329480 | A1 | 11/2018 | Schwartz et al. |
| 2021/0268393 | A1* | 9/2021 | Smith ..................... G06F 3/011 |

FOREIGN PATENT DOCUMENTS

| DE | 69621844 T2 | 5/1998 |
| JP | 2016521212 A | 7/2016 |
| JP | 2017532825 A | 11/2017 |
| JP | 2020166885 A | 10/2020 |

(Continued)

OTHER PUBLICATIONS

German Office Action dated Jul. 30, 2021 corresponding to application No. 102020128395.4.

(Continued)

*Primary Examiner* — Kien T Nguyen
(74) *Attorney, Agent, or Firm* — Nath, Goldberg & Meyer; Jerald L Meyer; Morgan D. Rosenberg

(57) ABSTRACT

The present invention relates to a method for operating an amusement park (1) for at least one visitor (5) and having at least one attraction (2), wherein at least one exoskeleton unit (30) comprising at least one movement device (32) is provided for the at least one visitor (5) and the at least one exoskeleton unit (30) forces at least one movement or stance upon the at least one visitor (5). In addition, the present invention relates to an amusement park.

15 Claims, 1 Drawing Sheet

(56) References Cited

FOREIGN PATENT DOCUMENTS

WO 2020/041228 A1 2/2020

OTHER PUBLICATIONS

Figure 1:
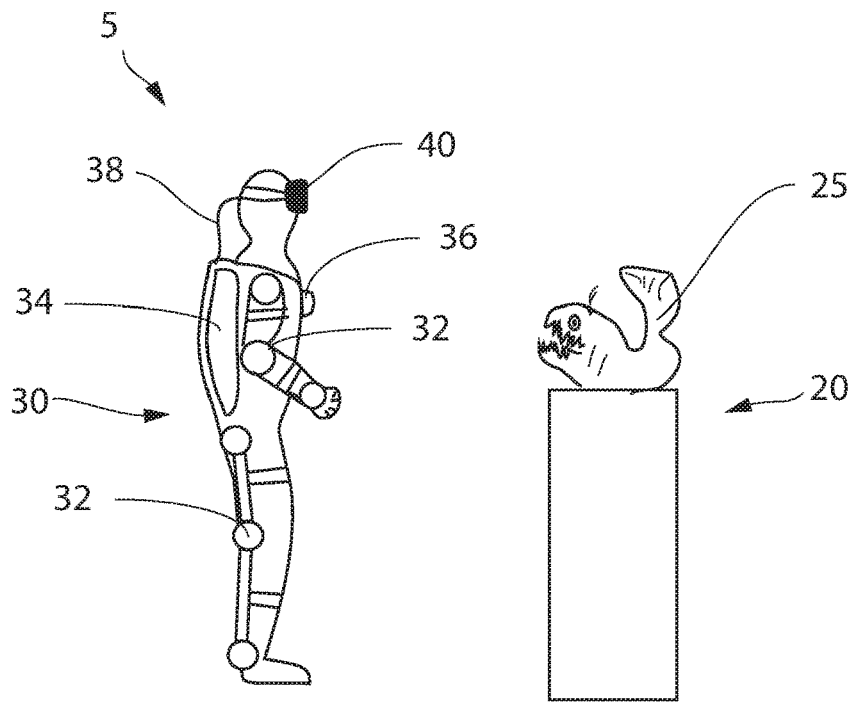

Office action issued by the JPO on Mar. 14, 2023 in parallel pending Japanese patent application No. 2021-172378 with English translation.
Office Action issued Mar. 28, 2023, in parallel pending Canadian patent application No. 3,135,896.
EESR issued Mar. 30, 2022, in corresponding European application No. 21 203 343.5.

* cited by examiner

METHOD FOR OPERATING AN AMUSEMENT PARK AND AMUSEMENT PARK

The present invention relates to a method for operating an amusement park for at least one visitor and having at least one attraction, wherein an exoskeleton unit having at least one movement device for generating a haptic stimulation is provided for the at least one passenger, having the features of claim 1, and to an amusement park having at least one attraction, in particular a "walk-through" or a dark ride, having the features of claim 10.

A large number of methods for operating an amusement park as well as different amusement parks are already known from the prior art, it being possible for an amusement park to be a stationary facility or a collection of semi-stationary attractions, such as a public festival or a funfair. In the prior art, visitors to the amusement park and the at least one attraction are entertained by the attraction itself and/or by animations or events, with the visitors to the amusement park typically exploring the amusement park according to individual interests and visiting the at least one attraction at will. In order to control visitor flows in amusement parks, waiting times for the at least one attraction are specified in the prior art, for example, or visitors can book specific time periods in which it is possible to bypass a line to visit a ride.

Furthermore, exoskeleton units are generally known from the prior art as artificial and technical support structures. Exoskeleton units are used in medicine or ergonomics, for example, and can support or intensify the user's movements by means of driven joints.

Based on this prior art, the object of the present invention is to provide a method that eliminates the above-mentioned disadvantages of the amusement parks known from the prior art and offers the at least one visitor to an amusement park an extraordinary experience with a high entertainment value.

These objects are achieved by a method for operating an amusement park that has at least one attraction, having the features of claim 1, and by an amusement park that has at least one attraction, having the features of claim 14.

Further advantageous embodiments of the present invention are specified in the dependent claims.

The method according to the invention having the features of claim 1 for operating an amusement park for at least one visitor and that has at least one attraction, which preferably has a course, is characterized in that an exoskeleton unit having at least one movement device is provided for the at least one visitor, which unit can force a movement and/or stance upon the at least one visitor. Here and in the following, an amusement park is understood to be a stationary or semi-stationary spatial facility that has at least one attraction. The at least one attraction can be a ride, a show booth, or the like, in which the at least one visitor or a plurality of visitors are to be entertained by technical means.

In the context of this invention, the exoskeleton unit is a unit which can be arranged on the body and/or the clothing of the at least one visitor and which, by technical means, can generate a mechanical movement or a haptically perceptible stimulation. To this end, the exoskeleton unit can be driven by means of actuators, be provided with support devices, and support, brake, intensify, and/or force joint movements of at least one body member, such as an arm, leg, hand, finger, and/or foot, but also of the back, neck, and/or head of the at least one user.

The present invention is therefore based on the concept of linking a visit to an amusement park as an experience to a haptic stimulation by the exoskeleton unit or to a stance and/or movement forced by said unit, thus enabling new kinds of experiences for the at least one visitor. To this end, the exoskeleton unit comprises at least one movement device which can generate a haptic stimulation or can produce or force a movement of an articulated body part. The at least one visitor experiences a special thrill if they temporarily lose control of their body or at least one part of their body and are "remote-controlled"—in particular if this is in synchronization with an experience in the ride or the attraction.

According to a development of the method according to the invention, the stance or the movement of the visitor is forced, dampened, or braked, and/or a stance of the visitor is determined. By forcing a movement of the visitor, for example, the at least one visitor can be actively controlled or remote-controlled. In one scenario, the visitor can be forced to stay on a predefined course of an attraction or the amusement park, or to go specifically to the at least one attraction in the amusement park. By forcing the movement of the at least one visitor, visitor flows can be optimized, as a result of which, for example, visitors can be guided specifically to attractions that are being visited on a less frequent basis and/or according to a desired profile of the user. The thrill can also be increased by specifically determining a stance of the visitor and at the same time increasing safety, since physical reactions of the visitor can be prevented or dampened. By means of this measure, the visitor can be guided closer to what is happening in an attraction, for example, without the risk of the visitor running away, thrashing around, or exhibiting other potentially endangering physical reactions in moments of surprise. The at least one visitor can also be involved in what is happening in an attraction by forcing movements on said visitor which—as will be explained in detail below—can preferably be synchronized with what is happening in the attraction.

According to a development of the method, the exoskeleton unit can force the movement or stance of the at least one visitor on the basis of time, the position, and/or the orientation of the visitor and/or as a result of received control commands. The control commands can preferably be received via an interface of a communication means.

Furthermore, it has proven to be advantageous if the exoskeleton unit has a first operating mode and at least one second operating mode. In the first operating mode, the movement or stance can be forced independently of a posture, movement, and/or desired movement of the at least one visitor, and the at least one visitor has no control over the movement or the stance. In the second operating mode, the movement and/or the desired movement of the at least one visitor can be supported.

In this operating mode, the control of the exoskeleton unit can follow a movement predefined by the user, for which purpose a sensor system can be provided which detects a desired movement of the visitor. For example, the sensor system can comprise at least one pressure sensor and/or at least one torque sensor—for example in a joint of the exoskeleton unit—which detect a movement of the user. Alternatively, at least one electromyogram sensor can be provided which detects the activation of a muscle or a muscle group in order to detect a movement of the user or a desired movement of the visitor. The exoskeleton unit can then perform, support, brake, dampen, or inhibit a movement corresponding to the activation of the muscle. Alternatively, the control of the exoskeleton unit can be predefined, as a result of which a movement can be forced upon the visitor.

The exoskeleton unit can, for example, enable visitors with a disability to "walk" around the amusement park normally or to explore it without having to rely on other movement aids such as wheelchairs, walking aids, rollators, or the like. In this case, the exoskeleton unit can either follow a movement defined by the user or detect a desired movement by means of the at least one electromyogram sensor. However, it is also possible to bring the technology of the exoskeleton unit closer to visitors without physical impairments and, for example, to bring them closer to supernatural powers as a kind of technology demonstrator and, if necessary, to present an augmented immersive experience by means of presented content.

The amusement park and/or the attraction preferably has at least one reproduction device, wherein the exoskeleton unit can be synchronized with the reproduction device. To this end, the exoskeleton unit can be connected to a system controller and/or to a control device of the amusement park via the interface of the communication means, or can react to signals of the reproduction device by means of a corresponding sensor system. The reproduction device can, for example, reproduce one or more technical effects and/or media content. By synchronizing the reproduction device with the at least one exoskeleton unit, effects and haptic stimulations or forced movements of the at least one visitor can be combined, as a result of which the awareness of the visitor with the exoskeleton unit fades into the background and the content represented by the reproduction device is perceived as particularly real.

According to a development, the exoskeleton unit can guide the at least one visitor at least partly and/or temporarily by means of haptic stimulations through the amusement park and/or through the attraction by means of a predefined data set. For example, a model of the amusement park and/or the attraction can be stored in the exoskeleton unit, the system controller of the attraction, and/or the control device of the amusement park. The at least one visitor can either be encouraged by a kind of "geofence" on a course of the attraction or the amusement park to follow the course or, to optimize throughput, be encouraged to reach specific waypoints within predefined time spans, in order to control visitor flow—in particular in a "walk-through" attraction—and to ensure continuous, predictable throughput operation. As soon as the at least one visitor leaves the predefined course, path, or "geofence" or begins to move too slowly, in particular through the attraction, the exoskeleton unit can switch from the second operating mode to the first operating mode and use stimulations or forced movements to control the particular visitor. In particular, time specifications can be defined for each attraction in order to determine the maximum length of stay. If the visitor moves too slowly or stays too long in one place, a corresponding stimulation can be used to optimize throughput.

Furthermore, it is advantageous if the amusement park and/or the attraction has visitor detection means, and that, on the basis of the visitor detection means, the exoskeleton unit forces a movement and/or stance upon the at least one visitor. The visitor detection means can, for example, detect the number of further visitors in an area of the amusement park and/or an attraction and/or a throughput of further visitors in an area of the amusement park and or the attraction. In other words, the visitor detection means can detect the congestion of visitors in an area of the amusement park, an attraction, or in an area of an attraction and specifically stimulate the at least one visitor in order to achieve a throughput optimization. Either the at least one visitor can be directed to a less frequented area of the amusement park or attraction or they can be stimulated or forced to pass through the attraction or amusement park or area of the attraction more quickly in order to achieve throughput optimization and to better control user flows.

According to a development of the proposed method, an XR headset is provided to the at least one visitor and the XR headset can present media content to the at least one visitor in each case. At this juncture it should be noted that, in the context of this invention, the term "XR" is used as a synonym for AR (augmented reality), VR (virtual reality), ER (extended reality). MR (mixed reality), etc., this list not being restrictive or exhaustive.

According to a development, the exoskeleton unit can communicate with the amusement park and/or the attraction and/or the XR headset. For example, the system controller or the control device of the amusement park can "remotely control" the exoskeleton unit by means of corresponding control commands, but the exoskeleton unit can also transmit information to the system controller and/or the control device of the amusement park. In particular, it is possible for the exoskeleton unit to transmit a position and/or orientation to the system controller and/or control device of the amusement park, where the position and/or orientation corresponds to the position of the particular at least one exoskeleton unit or of the visitor wearing the exoskeleton unit. The exoskeleton unit can also transmit further information which can be used to assess the experience value of the at least one user. Such information can include, for example, the physical reaction of the at least one user to an effect or to content of the attraction or the reproduction device and contribute to the improvement of the experience value of an attraction or of an amusement park. In principle, bidirectional communication between the system controller of the attraction and/or the control device of the amusement park is therefore possible.

It may also be possible to synchronize the at least one movement and/or stance forced by the exoskeleton unit with the content reproduced by the XR headset. The exoskeleton unit can consequently communicate with the XR headset, as a result of which, in addition to visual or audiovisual stimulation via the XR headset, a haptic stimulation tuned thereto can be carried out by a movement and forced stance. In this way, the highest possible intensity of immersion can be achieved.

The exoskeleton unit can also provide data for generating the content to a data processing device that generates the content, the content being generated on the basis of the data or with the data taken into account. This enables a detailed representation of the content. Status information can be transmitted that makes it possible, for example, for the XR headset to represent appendages in a realistic manner. For example, arms, hands, fingers, legs, and/or feet can be represented accordingly, as a result of which the experience of the content can be augmented.

Furthermore, it has proven to be advantageous for the exoskeleton unit to use a sensor system which can detect or monitor an environment of the exoskeleton unit. On the basis of the sensor system or on the basis of the data determined by the sensor system, the exoskeleton unit can force at least one stance or movement of the user. If, for example, a particular distance to an object and/or another visitor is not being met, specific stimulation of the visitors can prevent this distance from being reduced further. In the event that an XR headset is provided to the at least one user, the sensor system of the XR headset can also be used, i.e., in addition or alternatively.

The sensor system can detect influences from the environment, such as objects or other visitors. The exoskeleton unit can thus help to avoid a collision with real objects and to keep a distance from other visitors.

For example, real objects in the amusement park and/or the attraction may not be represented by the content of the XR headset. In addition, it may not be possible for the at least one visitor to see these real objects, in particular in a dark ride. The sensor system can also be used, for example, for compliance with hygiene rules in order to ensure that the attraction and/or the amusement park are operated in accordance with the requirements.

According to a development of the above-described method and the developments thereof, the exoskeleton unit has operating means which can be used by the at least one user to control the exoskeleton unit in each case. The operating means can preferably be a human-machine interface, and further preferably the exoskeleton unit has mechanical operating means and/or voice control. The operating means can have a panic function which is due to the fact that the exoskeleton unit restricts the freedom of movement of the user. Voice control can make it possible for a voice command or "code word" to be used which causes the exoskeleton unit to return complete control to the visitor over their movement or stance or body.

Using the operating means, but also remote-controlled by the system controller and/or the control device of the amusement park and/or on the basis of the position and/or orientation, the exoskeleton unit can switch from the second operating mode, which includes a forced guidance of the body or part of the body, to the first operating mode, in which the exoskeleton unit detects a desired movement of the at least one user and follows or supports said movement.

A further aspect of the present invention relates to an amusement park, in particular for carrying out the above-described method and its developments, having at least one attraction, in particular a "walk-through" or dark ride, comprising at least one exoskeleton unit that has at least one movement device, the exoskeleton unit being configured to force a stance and/or a movement upon the at least one visitor.

According to a preferred development of the amusement park, communication means are provided and the at least one exoskeleton unit can communicate with the amusement park and/or the attraction using the communication means. The communication means can enable bidirectional communication between the at least one exoskeleton unit and the amusement park and/or the attraction, the communication preferably being wireless. Control commands and information can be exchanged using the communication means. For example, an operating state, a position, an orientation, and/or sensor data of the exoskeleton unit can be transmitted to the amusement park and/or the attraction or the control device of the amusement park and/or the system controller of the attraction. This offers the possibility of moving freely in a space in the amusement park or the attraction and interacting with the scenery, instead of simply being driven through the scenery or passing through it as previously in the prior art.

In accordance with a preferred development, at least one XR headset is provided for representing content to the at least one visitor, it being possible to synchronize the at least one XR headset with the exoskeleton unit. The exoskeleton unit can be connected to the XR headset by means of an interface, which allows the XR headset to transmit control commands to the relevant exoskeleton unit. The exoskeleton unit can also have a data processing device that outputs or generates the content and transmits the content represented by the XR headset to the XR headset via the interface. The exoskeleton unit can supplement events in the represented content with haptic stimulations and transmit haptic feedback to the body of the at least one visitor, as a result of which the experience in the amusement park or the attraction becomes even more illusive. The attraction can be, for example, a free roaming VR or AR application.

In addition, it has proven to be advantageous if the amusement park and/or the at least one attraction has visitor detection means. The visitor detection means can be used for capacity estimates and visitor flow planning, wherein the number of visitors can be detected and/or estimated in the at least one attraction and/or in a line of the at least one attraction. The visitor detection means can transmit data to the control device of the amusement park and/or the system controller of the at least one attraction, and measures can be determined on the basis of a model which optimize the visitor throughput and enable specific visitor flow planning. For example, visitors can be directed to less frequently visited attractions by means of haptic stimulations, or the exoskeleton unit can establish restrictions on a path in the amusement park or the course of the attraction without a visible barrier.

Furthermore, it has proven to be advantageous if at least one reproduction device is provided. The at least one reproduction device can, however, also be arranged in or at the at least one attraction in the amusement park, and can present a scenario to the at least one visitor. The reproduction device, the system controller of the attraction or the control device of the amusement park can be synchronized either directly—or indirectly via a subordinate system—with the at least one exoskeleton unit.

For example, for Halloween or a "Horror Night", the at least one visitor can put on or dress up in the exoskeleton unit. In synchronization with the reproduction device, the system controller of the attraction or the control device of the amusement park, the at least one visitor can be deprived of their freedom of movement at least temporarily or and/or in some areas by means of a forced movement, a frozen stance, or a forced stance. This makes it possible to subject the at least one visitor to threatening scenarios very close by, without having to fear startle responses, such as running away or hitting. Dangers to the at least one visitor as well as to other visitors are minimized or excluded. In this scenario, the visitor can be forcibly guided by the haptic stimulation and thus be affected by a "foreign, external force", which will make the scenario in the amusement park or the attraction even more intense. The at least one user can also become part of the scenario themselves by means of forced guidance, in which the at least one visitor is forced to carry out movements that are synchronized with the scenario of the reproduction device.

It has proven to be advantageous if position detection means are provided which can detect a position of the at least one exoskeleton unit in the amusement park or in the attraction. The position detection means can be stationary, i.e., in a fixed place in the amusement park, and track the at least one exoskeleton unit in the amusement park. In addition or alternatively, the position detection means can be provided in the exoskeleton unit and are based on known position detection methods. Furthermore, in addition or alternatively, the exoskeleton unit can use position detection means of the XR headset.

By means of a predefined data set, the at least one exoskeleton unit can force movements or stances of the at least one user on the basis of the position and/or orientation at least partly or temporarily, it being possible for the data set to be stored locally in the exoskeleton unit and/or externally, for example in the control device of the amusement park and/or the system controller of the attraction, but also in the data processing device of the XR headset. The data set may include, for example, a digital model of the amusement park and/or the attraction or the course of the attraction. The exoskeleton unit can guide the at least one visitor on virtual paths, as a result of which the movement pattern of the visit can be determined and the visitor can be kept on predefined paths without visible barriers. This results in a large number of scenarios which can be used for user flow planning and capacity estimates, and also for the amusement of the visitors, and which can be used modularly.

According to a further development of the exoskeleton unit, a sensor system is provided by means of which the environment of the at least one visitor with the exoskeleton unit can be detected or monitored. On the basis of the sensor system or on the basis of the data determined by the sensor system, the exoskeleton unit can exert at least one haptic stimulation on the users. If, for example, a particular distance to an object and/or another visitor is not being met, haptic stimulation can be generated in order to deter the visitor from further reducing the distance. In the event that an XR headset is provided to the at least one user, the sensor system of the XR headset can also be used, i.e., in addition or alternatively.

The sensor system can monitor the environment of the at least one visitor or of the exoskeleton unit on the at least one visitor and detect objects or other visitors. The exoskeleton unit can avoid a collision with real objects or keep a distance. For example, the real objects may not be represented in the content of the XR headset and/or it may not be possible for the at least one visitor to see said objects, in particular in a dark ride. The sensor system can also be used, for example, for compliance with hygiene rules in order to ensure that the attraction and/or the amusement park are operated in accordance with the requirements.

A further aspect of the present invention relates to the use of an exoskeleton unit for visitor flow planning and/or management of at least one visit to an amusement park or an attraction.

Figure 2:
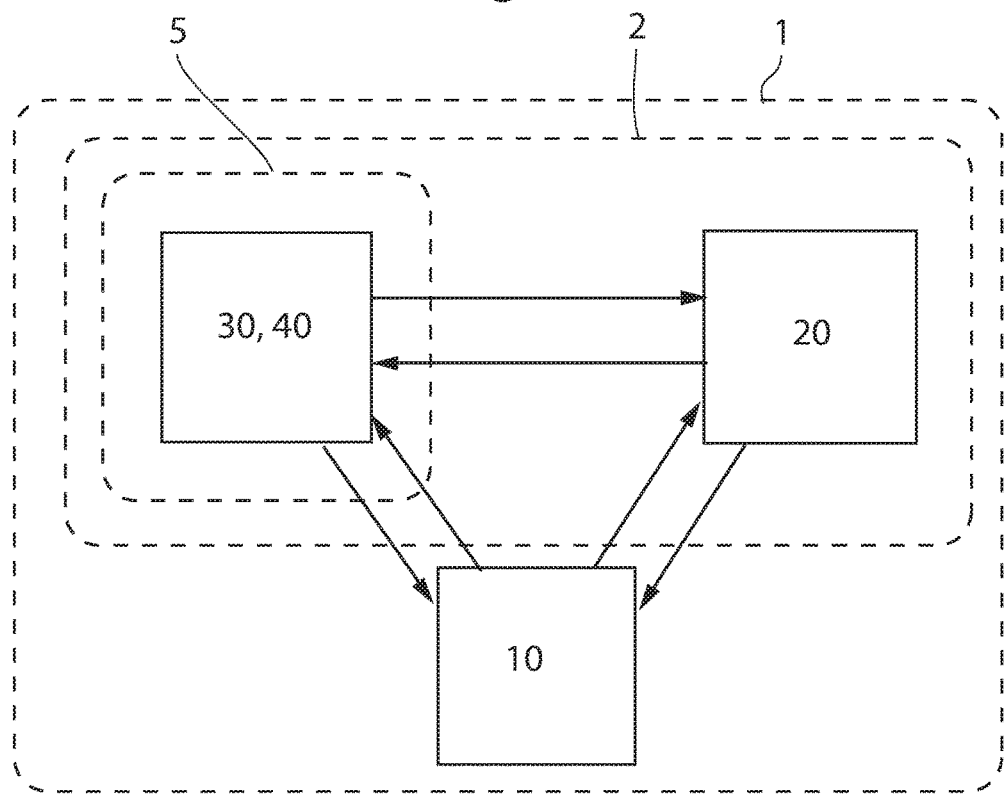

An exemplary embodiment is described in detail below with reference to the accompanying drawings. In the drawings:

FIG. 1 is a schematic representation of a visitor to an attraction of an amusement park with an exoskeleton unit and an XR headset, and FIG. 2 is a schematic and greatly simplified representation of the amusement park.

In the drawings, identical or functionally identical components are identified below with the same reference numerals. For the sake of clarity, not all parts that are the same or functionally the same in the individual Figures are provided with a reference number.

FIG. 1 shows a visitor 5 of an amusement park 1 who is visiting an attraction 2 to have an experience. The visitor 5 is wearing an exoskeleton unit 30 which, by technical means, can generate a mechanical and haptically perceptible stimulation for the user 5, as a result of which a movement or a stance of at least one body part or body member can be forced upon the visitor 5.

The exoskeleton unit 30 can have a plurality of movement devices 32, by means of which the joint movements of the at least one user 5 can be supported, braked, intensified, and/or forced, thus generating a mechanical and haptically perceptible stimulation for the user 5.

The movement device 32 can comprise one or more actuators which generate a movement—adapted the body part or the body member—on a support structure, the support structure 33 being coupled to the body part or the body member by fastening means.

In the illustrated exemplary embodiment, the exoskeleton unit 30 can act both on the legs of the user 5 and on the arms of the user 5, and for this purpose comprises a controller 34, which can be arranged in the form of a backpack on the back of the user 5 and which can process the control commands and control the movement devices 32 accordingly.

The control of the movement devices 32 or of the actuators by the controller 34 of the exoskeleton unit 30 can take place in different ways. In a first operating mode, the exoskeleton unit 30 can predefine or force a stance or a movement of the visitor 5. The visitor 5 is "remote-controlled" or guided by a foreign, external force.

In a second operating mode, the exoskeleton unit 30 can follow a movement predefined by the visitor 5. For this purpose, a sensor system 36 can be provided which detects a desired movement of the visitor 5. The sensor system 36 can comprise at least one pressure sensor and/or at least one torque sensor, which can be arranged in a joint of the exoskeleton unit 30 in order to detect a movement of the visitor 5. At least one electromyogram sensor can also be provided which detects the activation of a muscle or a muscle group in order to detect a movement of the visitor 5 or a desired movement of the visitor 5. The exoskeleton unit 30 can then perform a movement corresponding to the activation of the muscle by means of the at least one movement unit 32 or of the at least one actuator and generate a haptic stimulation or support, brake, dampen, or inhibit a movement.

The controller 34 can also have an energy storage device (not shown), which can supply energy to the electronics of the controller 34 and to the movement device 32 of the exoskeleton unit 30. The electronics of the controller 34 can comprise a data processing device (not shown) on which data and programs specific to the amusement park 1 or the attraction 2 can be stored which allow the movement unit 32 to generate the haptic stimulation or the movement of the user 5 on the basis of the position and/or orientation of the exoskeleton unit 30 or of the visitor 5.

The amusement park 1 can have one, preferably a plurality of attractions 2 and can further comprise a control device 10. The attraction 2 and the amusement park 1 can have at least one reproduction device 25 which can reproduce or present entertainment effects or content and which can be controlled by a system controller 20 as well as by the higher-level control device 10 of the amusement park 1.

The amusement park 1 and/or the at least one attraction 2 can provide a large number of exoskeleton units 30 for visitors, which are given to the visitor at an entrance area of the amusement park 1 and/or the attraction 2. Said units can be returned when leaving the attraction 2 or amusement park 1.

The attraction 2 according to FIG. 1 can be a so-called "walk-through" attraction, in which the attraction 2 predefines a course that the visitor 5 can pass through. Along the course, the visitor 5 is presented with effects, representations, or animations that have a particularly high entertainment value and cause thrills. In one embodiment, the exoskeleton unit 30 can, for example, guide the visitor 5 through the amusement park 1 and/or through the attraction 2. To this end, the position and/or orientation of the exoskeleton unit 30 or of the visitor 5 in the amusement park 1 and/or the attraction 2 can be realized in different ways—as will be explained below:

The sensor system 36 can have position detection means which can be used to detect the position and/or orientation of the exoskeleton unit 30 in the amusement park 1 and/or the attraction 2. To this end, one or more position detection means—which are already sufficiently known from the prior art—can be provided, which enable detection of the position and/or the orientation both in the open air and in closed spaces.

The position and/or orientation of the exoskeleton unit 30 can also be realized by means of the amusement park 1 and/or by means of the particular attraction 2, it being possible for the control device 10 of the amusement park 1 or a system controller 20 of the attraction to detect the position and/or the orientation of the exoskeleton unit 30 of the user 5.

It is also possible to provide the exoskeleton unit 30 which has an XR headset 40 to the visitor 5, the exoskeleton unit 30 being able to use a sensor system (not shown) of the XR headset 40 to detect the position and/or the orientation of the exoskeleton unit 30 or of the user 5.

The XR headset 40 can present media content to the at least one visitor 5 in each case, and at least one haptic stimulation generated by the exoskeleton unit 30 can be synchronized with the media content. The exoskeleton unit 30 can communicate with the XR headset 40 via an interface, as a result of which, in addition to a visual or audiovisual stimulation via the XR headset 40, a haptic stimulation tuned thereto can be carried out by the exoskeleton unit 30. In this way, the highest possible intensity of immersion can be achieved. The term "XR" is used as a synonym for AR (augmented reality), VR (virtual reality), ER (extended reality), and MR (mixed reality).

At this juncture it is noted that the above-described methods of detecting the position and/or the orientation of the exoskeleton unit 30 or of the user 5 can be combined with one another.

The exoskeleton unit 30 can communicate with the system controller 20 of the attraction 2 and/or the control device 10 of the amusement park 1, the communication being bidirectional, as denoted in FIG. 2 by the arrows. Control commands and status information can be exchanged.

The control device 10 and/or system controller 20 can, for example, transmit control commands or data to the exoskeleton unit 30, as a result of which the user 5 can be directed through the amusement park 1 or the attraction 2. For example, the user 5 can be directed specifically to the at least one attraction 2 and/or through the attraction 2 by means of haptic stimulations by the exoskeleton unit 30, or can be guided along predefined paths, without visible barriers having to be provided in order to direct the visitors 5. The at least one user 5 can be directed or controlled, for example, by inhibiting the movement as soon as the visitor 5 leaves a predetermined path or geofence. A movement which directs the at least one visitor 5 can also be forced upon the at least one visitor 5.

The exoskeleton unit 30 can be synchronized with what is happening in the attraction 2 or amusement park 1, as a result of which the exoskeleton unit 30 forces a movement or stance upon the visitor 5 in relation to time or space. For example, the visitor 5 can be integrated into what is happening in the amusement park 1 or the attraction 2 by means of specifically generated movements. It is also possible to control the stance or the movement of the visitor 5 in order to prevent defensive reactions and minimize dangers in the case of special effects, for example of a reproduction device 25; this allows the visitor 5 to be integrated even more closely into what is happening in the amusement park 1 and/or the attraction 2.

Each attraction 2 and/or the amusement park 1 can have visitor detection means (not shown) which allow the congestion of visitors in the attraction 2 and/or in the amusement park 1 to be determined. The visitor detection means can, for example, detect the visitor density, preferably in areas, and detect, for example, the number of visitors in the attraction 2 or in the line at the attraction 2. By determining the visitor flows in the attraction 2 as well as in the amusement park 1, the at least one visitor 5 can be specifically stimulated to visit less frequented attractions 2 or areas of the amusement park 1, as a result of which visitor flows in the amusement park 1 can be influenced or controlled.

For example, in the attraction 2, the visitor 5 can be encouraged by the exoskeleton unit 30 to pass through the course within a predefined time window in order to optimize visitor throughput in the attraction 2 and to control the visitor flow within the attraction 2.

The XR headset 40 can have its own data processing device for generating the content that is to be presented to each visitor 5. The XR headset 40 can, for example, generate a virtual reality—in particular on the basis of the position and/or orientation of the XR headset in the attraction 2 or in the amusement park—and present the content to the visitor 5 stereogeographically. In synchronization with the generated content, the exoskeleton unit 30 can generate haptically perceptible stimulations for the visitor 5, thus enabling a maximum possible intensity of immersion to be achieved.

The exoskeleton unit 30 can also transmit data to the XR headset 40. For example, the exoskeleton unit 30 can determine the stance of the arms or legs and transmit corresponding data to the XR headset 40. The stance of the legs or arms can be represented realistically in the reproduced content of the XR headset 40.

According to a development (not shown), the data processing system for generating the reproducible content can be a component of the controller 34 of the exoskeleton unit 30. The controller 34, the data processing system, the sensor system, communication means, and the energy supply can be provided in such a compact device, in particular in a backpack, as a result of which a comprehensive immersive experience can be generated for the at least one visitor 5.

LIST OF REFERENCE NUMERALS

1 Amusement park
2 Attraction
5 Visitor
10 Control device
20 System controller
25 Reproduction device
30 Exoskeleton unit
32 Actuator
34 Controller
36 Sensor system
40 XR headset

The invention claimed is:

1. A method for operating an amusement park (1) for at least one visitor (5), comprising:
providing at least one exoskeleton unit (30) comprising at least one movement device (32) for the at least one visitor (5);
forcing at least one movement upon the at least one visitor (5) with the at least one exoskeleton unit (30) such that the at least one visitor (5) is physically guided at least partly and/or temporarily through the amusement park (1) and/or through a course of at least one attraction (2) of the amusement park (1) following a predefined control data set defining a travel path for the at least one visitor (5).

2. The method according to claim 1, characterized in that the exoskeleton unit (30) dampens the movement of the visitor (5).

3. The method according to claim 1, characterized in that the exoskeleton unit (30) generates the at least one movement on the basis of time, the position, and/or the orientation of the visitor (5) and/or as a result of received control commands.

4. The method according to claim 1, characterized in that the exoskeleton unit (30) has a first operating mode in which the movement is forced independently of a posture, movement, and/or desired movement of the at least one visitor (5) and at least one second operating mode in which the posture, movement, and/or desired movement of the at least one visitor (5) is supported.

5. The method according to claim 1, characterized in that the amusement park (1) and/or the attraction (2) has visitor detection means, and in that the exoskeleton unit (30) is operated on the basis of the data detected by the visitor detection means.

6. The method according to claim 1, characterized in that an XR headset (40) is provided to the at least one visitor (5), and in that the XR headset (40) presents content to the at least one visitor (5).

7. The method according to claim 1, characterized in that the exoskeleton unit (30) of the amusement park (1), the attraction (2), and/or of the XR headset (40) control commands.

8. The method according to claim 1, characterized in that a sensor system (36) is provided, and in that the exoskeleton unit (30) acts upon the at least one visitor (5) if the at least one visitor (5) leaves a predetermined path, area, or time window or if a predefined distance to an object or another visitor is no longer being met.

9. An amusement park (1) comprising:
at least one attraction that has a course (2); and
at least one exoskeleton unit (30) that has at least one movement device (32) for at least one visitor (5),
wherein at least one movement can be forced upon the at least one visitor (5) with the at least one exoskeleton unit (30) such that the at least one visitor (5) is physically guided at least partly and/or temporarily through the amusement park (1) and/or through the course of the at least one attraction (2) following a predefined control data set defining a travel path for the at least one visitor (5).

10. The amusement park (1) according to claim 9, characterized in that communication means are provided and in that the amusement park (1) and/or the at least one attraction (2) can transmit control commands to the exoskeleton unit (30).

11. The amusement park (1) according to claim 10, characterized in that at least one reproduction device (25) is provided, and in that the at least one reproduction device is synchronized with the at least one exoskeleton unit (30) via communication means.

12. The amusement park (1) according to claim 9, characterized in that the amusement park (1) and/or the at least one attraction (2) has visitor detection means.

13. The amusement park (1) according to claim 9, characterized in that at least one XR headset (40) is provided for representing content to the at least one visitor (5), and in that the exoskeleton unit (30) can communicate with the XR headset (40).

14. The amusement park (1) according to claim 9, characterized in that position detection means are provided which can detect a position of the at least one exoskeleton unit (30) in the amusement park (1) or in the attraction (2).

15. The amusement park (1) according to claim 9, characterized in that the at least one exoskeleton unit (30) has a sensor system (36).

* * * * *